Dec. 18, 1951 H. F. SCHMIDT 2,578,901
FLEXIBLE SHAFT SWITCH-ACTUATING
MEANS FOR KITCHEN MIXER MOTORS
Filed March 23, 1946 3 Sheets-Sheet 1

INVENTOR.
Howard F. Schmidt
BY HIS ATTORNEYS
Jason and Mahoney

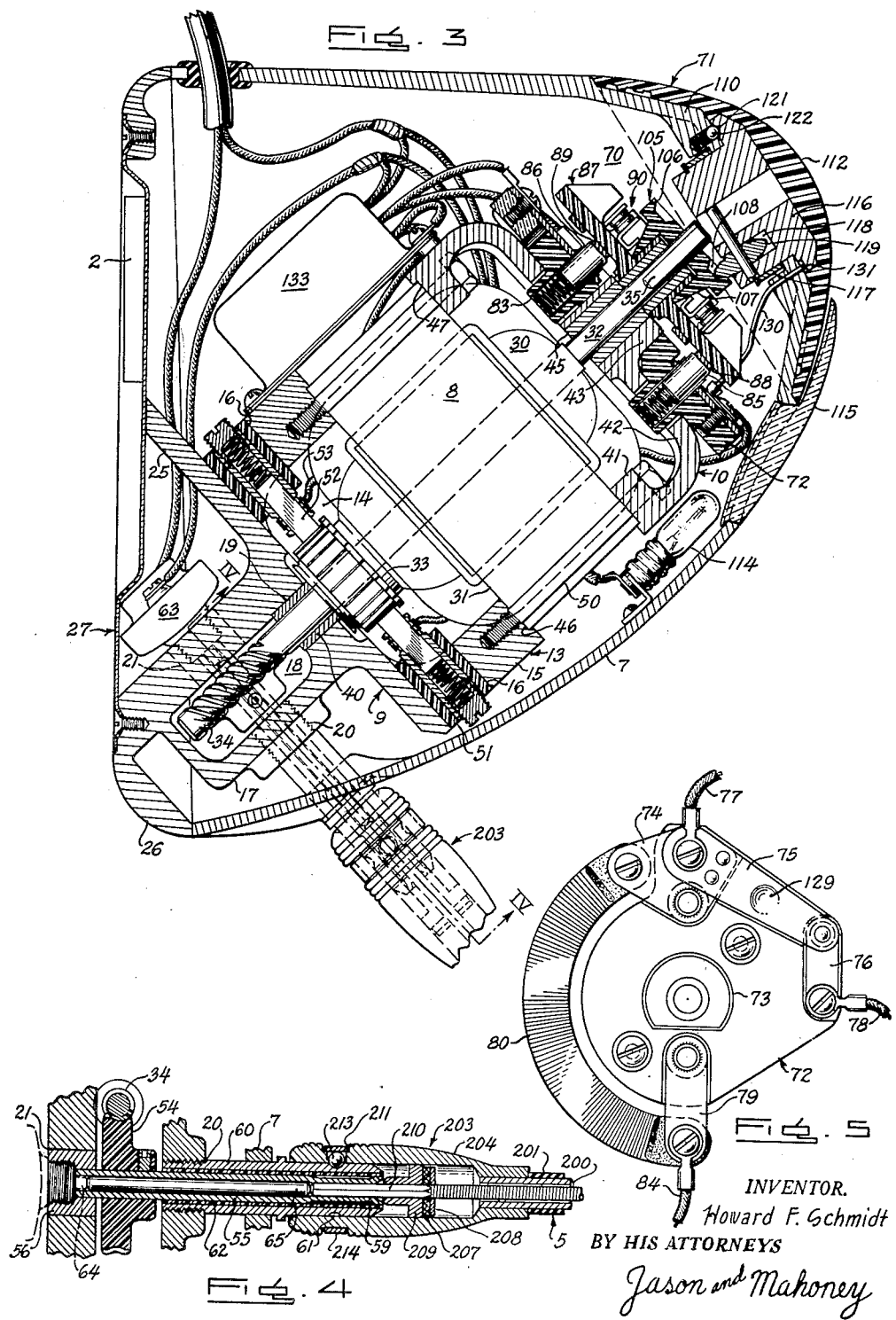

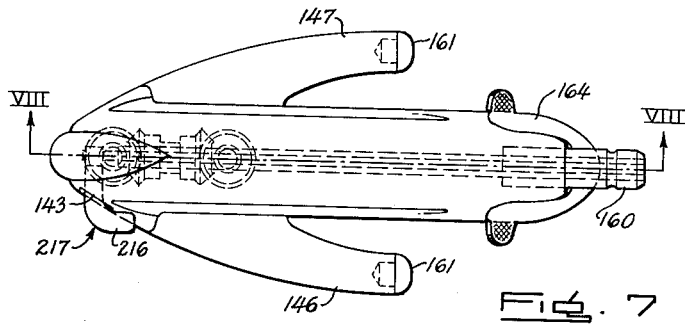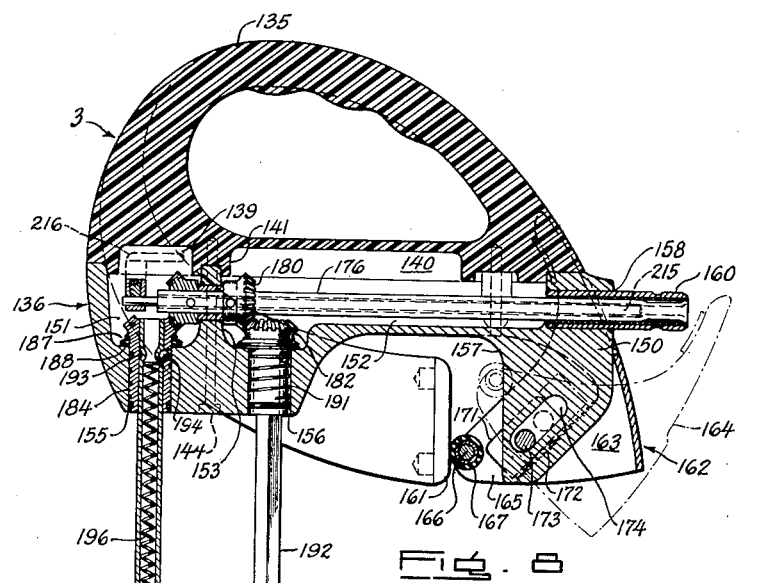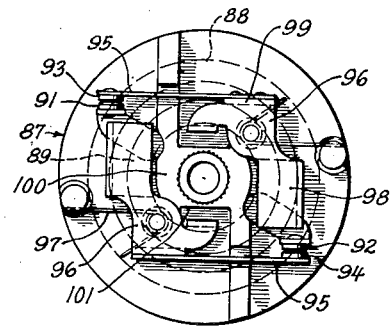

Patented Dec. 18, 1951

UNITED STATES PATENT OFFICE 2,578,901

FLEXIBLE SHAFT SWITCH-ACTUATING MEANS FOR KITCHEN MIXER MOTORS

Howard F. Schmidt, San Diego, Calif., assignor of one-eighth to Walter J. Jason, one-eighth to Thomas P. Mahoney, one-eighth to Mildred E. Novak, all of San Diego, and one-eighth to Glendon T. Gerlach, Coronado, Calif.

Application March 23, 1946, Serial No. 656,582

6 Claims. (Cl. 259—131)

This invention relates to improvements in household electric utility devices employed in the performance of various household tasks such as mixing, beating or whipping fluids and comminuting non-liquid materials and more particularly to a device having its power source at a point remote from the mixing head.

The conventional devices adapted to perform the mixing functions mentioned above have limitations curtailing their usefulness because of the specific form in which they are designed. Those acquainted with the conventional type electric mixer of the prior art know that despite the fact that its mixing, beating and whipping functions are adequately performed, the trouble involved in the cleaning, storage and setting up of the conventional type mixer severely limits the amount of use to which it is put. The present invention contemplates the use of a universal power source which is adapted to supply the power for a wide variety of household devices and which in use with a mixer head will effect the performance of mixing tasks with utmost efficiency. The power source also would be adapted to service with ease such devices as fruit juicers, peelers, and pot cleaners.

An object of the present invention is the provision of an improved form of household electric device whose power source will be located remote therefrom.

Another object of this invention is the provision of an improved form of household electric device which shall embrace the use of a central power source whose power shall be transmitted to the household device by means of a readily detachable flexible power transmission means.

Another object of this invention is the provision of a remote power source adapted to transmit power by means of a flexible transmission means to a variety of household devices, the design and construction of the combination being such that it is feasible to utilize the household devices immersed in water without danger of electrical shock to the user.

Another object of this invention is the provision in an electric household device connected to a remote power source by a flexible power transmission element of a quick disconnect coupling capable of being readily and quickly connected to and disconnected from both the remote power source and the household device being used.

Another object of this invention is the provision of an improved form of mixing device which is adapted for operation from a remote power source and which is designed to be mounted on the side of a vessel in a novel manner.

Another object of the invention is to provide a mixing device for operation from a remote power source, and mountable on a vessel, and so designed that the mixer when mounted is held in a predetermined relationship to the vessel.

Another object of this invention is the provision of a mixing device operable from a remote power source through a flexible transmission means and which is so designed and constructed that it is adapted for use with vessels of a wide variety of sizes, wall thicknesses and shapes.

Another object of this invention is the provision of an improved form of mixer head which is designed and constructed to assume a balanced position in relation to the vessel on whose side wall it is mounted so that it will not tip and will not require constant supervision while in use.

Other objects and features of this invention will be readily apparent to those skilled in the art from the following specification and appended drawings illustrating certain preferred embodiments in which:

Figure 3 is a sectional view taken along line III—III of Figure 2;

Figure 4 is a sectional view taken along line IV—IV of Figure 3;

Figure 5 is an elevational view of a contact support block utilized in the present invention;

Figure 6 is an elevational view of a switching assembly employed in the present invention;

Figure 7 is a top plan view of the mixer head; and

Figure 8 is a sectional view taken along line VIII—VIII of Figure 7.

Figure 1:
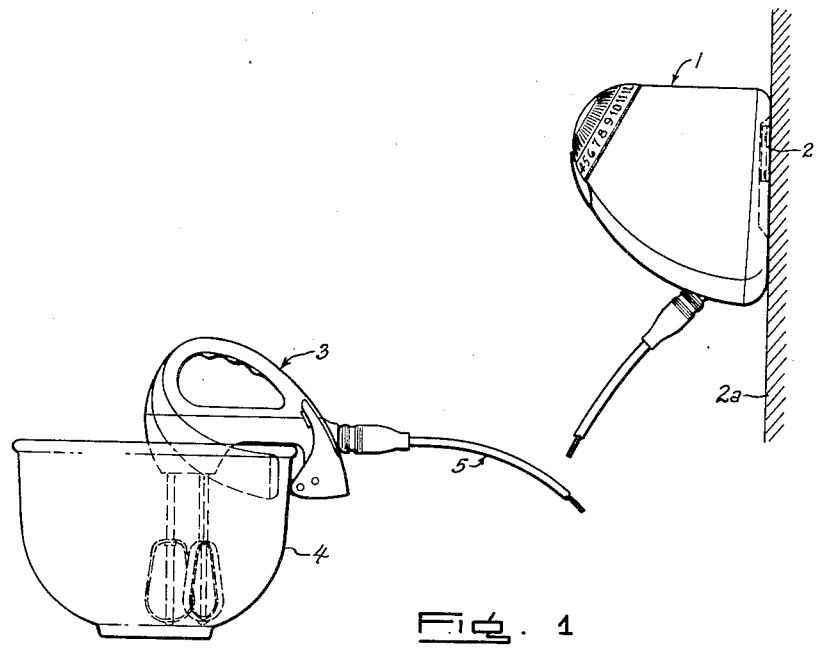
Figure 1 is an illustration of a mixer according to the present invention wherein the mixer head is mounted on a conventional type bowl and adapted to be driven by a flexible driving means from a remotely located power source.
Figure 2:
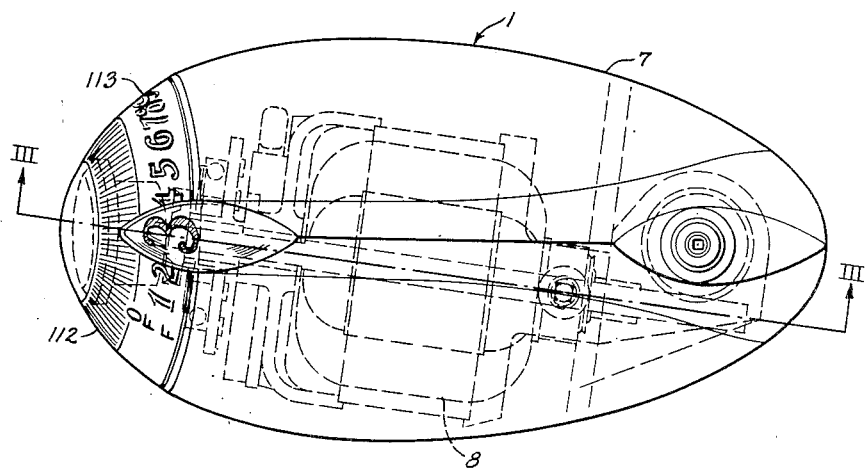
Figure 2 is a top plan view of the power unit.

As shown in Figure 1, the invention includes a power unit, indicated generally at 1, and mounted as by brackets 2 on a wall 2a, a mixer or beater head 3, remotely located therefrom, and fixedly mounted on a vessel or bowl 4, and a flexible drive shaft 5 operably interconnecting the power source 1 and the mixer head 3.

As seen from the drawings the remote power unit 1 comprises a hollow casing 7 of streamlined configuration. Within the casing 7 is disposed a motor 8. The motor 8 is retained in the casing 7 by a pair of motor mounts 9 and 10. The lower motor mount 9 consists of a main body portion 13 having therein a chamber 14. Through opposite walls 15 of body portion 13 extend apertures 16, opening into chamber 14. Subtending from the body portion 13, at substantially right angles, is an extension 17. Within extension 17 there is provided a chamber 18. An aperture 19 interconnects chamber 18, with chamber 14 in body portion 13. Oppositely located apertures 20 and 21 are provided in wall portions of extension 17 and lead to chamber 18. A pair of leg members 25 and 26 project, one from the body portion 13 and the other from extension 17. A cover plate 27 closes the open end portion of casing 7 and is affixed thereto by means of screws.

The electric motor 8 which is supported by the motor mounts 9 and 10 is of conventional design and consists of an armature 30 having associated therewith the usual coils or field windings 31. The armature 30 is carried by a rotatable shaft 32. Associated with the armature 30 and mounted on the shaft 32 is a commutator 33. A worm 34 is formed on one end of shaft 32. The opposite end of shaft 32 is provided with a flat surface 35 machined or otherwise formed thereon. In mounting the motor 8 the end of shaft 32 having the worm 34 is inserted through aperture 19 and into chamber 18. A bushing 40 of conventional type is disposed within aperture 19 and supports shaft 32. The commutator 33 is located within chamber 14 and juxtaposed to opposite orifices 16. The lower end portion of the armature 30 also fits within chamber 14.

The upper mount 10 consists of a ring-like portion 41 from which extends a spider 42, the legs of which define a chamber. A boss 43 is located centrally on the spider 42 and has an aperture extending therethrough. Pressed into this aperture is a bushing 45 of conventional type. The upper end of shaft 32 is supported by the bushing 45. With upper mount 10 in position the upper end of the armature 30 will be housed within the chamber in the upper mount 10.

The upper face of the main body portion 13 of the lower motor mount 9 is recessed to provide an annular land 46. The lower face of the ring-like portion 41 is similarly recessed to form annular land 47. With the upper motor mount 10 placed in assembled relationship to lower motor mount 9 the lands 46 and 47 will abut the ends of the field windings 31 and bear upon them and will thereby hold the winding in a fixed relationship to the armature 30. To maintain the upper mount 10 in proper relationship to lower mount 9 and thereby properly support the armature shaft 32 and to maintain the lands 46 and 47 in abutting engagement with the ends of the field windings 31 bolts 50 are inserted through openings in the ring-like portion 41 of the upper motor mount 10 and are threaded into the upper face of the main body portion 13 of the lower motor mount 9.

Mounted within the apertures 16 of lower mount 9 are brush holding cartridges 51 which carry spring-biased brushes 52, which brushes 52 engage the commutator 33. A pair of leads 53 supply the brushes 52 with electric current.

A worm gear 54 is disposed within the chamber 18 and engages with worm 34 on motor shaft 32. A rotatable hollow power shaft 55 extending at substantially right angles to the worm 34 carries the worm gear 54 in position. The lower end of shaft 55 is mounted in a bushing 56 located in aperture 21.

The worm gear 54 is preferably made of a material having high dielectric properties to prevent the inadvertent transmission of electric current from the electric motor 8 through the armature shaft 32.

A male coupling member 60 comprising a hollow cylinder is screwed at its lower end into the internally threaded aperture 20 and extends outwardly through an opening provided in the casing 7. The outer end of the male coupling 60 is frusto-conical in shape and is subtended by an annular recess 61. The coupling 60 is designed as described to permit the female portion of coupling 203, to be hereinafter described, to more readily fit thereover. The shaft 55, which supports the worm gear 54, extends into the male coupling 60. A dielectric sleeve or bushing 62 is disposed about the shaft 55 to further insulate the equipment against the inadvertent transmission of electric current from the electric motor 8. Shaft 55 is a hollow cylinder, as has been stated, but the opening therethrough is squared at its outer end 59 for a purpose to be described hereinafter.

"On-off" switch 63 of conventional design is placed in the motor circuit for controlling the starting and stopping of the motor 8. The actual construction of switch 63 forms no part of this invention. Any switch having a construction wherein its actuating rod on movement inwardly will either make and break the contained contacts and then move outwardly to a set position ready for the next operation will be suitable. A portion of the housing of switch 63 is threaded and screws within the bearing 56. From the switch 63 extends an actuating rod 64 which controls the operation of the contact elements (not shown) of switch 63. A push rod 65 is disposed within the hollow shaft 55 and serves to actuate the switch 63 as will be described.

A switching assembly indicated generally at 70 is provided in the motor circuit for controlling the speed of the motor 8, and is interposed between the upper motor mount 10 and a regulating dial indicated generally at 71.

A contact support block 72 (shown in Figures 3 and 5) of generally polygonal configuration and having an orifice 73 therethrough is mounted on the boss 43 and motor mount 10, the boss 43 extending into said orifice 73. The block 72 is secured to the motor mount 10 by conventional and suitable means. A generally triangularly shaped conductor plate 74 is mounted on the face of the block 72 and adjacent to the orifice 73. To the conductor plate 74 is secured one end of a spring type movable contact arm 75 which is adapted to engage and disengage a stationary contact 76 also supported on block 72, but which is normally biased away from contact 76. The movable contact 75 and the stationary contact 76 comprise an internal "on-off" switch for control of the motor 8. The manner of actuation of this switch will be described. A lead 77 connects the triangular plate 74 and the contact arm 75 to the field coils 31 of the electric motor 8. A power input lead 78 is connected to the contact element 76. An elongated conducting member 79 is mounted on the block 72 adjacent to the orifice 73 and has connected thereto one end of a semi-circular resistance element 80, of conventional design, whose other end is connected to the triangular plate 74. The resistance element 80 serves to prevent current surges through the electric motor 8.

Both the triangular shaped plate 74 and the conductor element 79 carry brush retaining cartridges 83. The cartridges 83 are imbedded in the block 72 and serve to secure the triangular plate 74 and the conducting member 79 on the contact block 72. A lead 84 connects the conductor element 79 to the field coils 31.

Disposed in the cartridges 83 are a pair of spring-biased brushes 85 and 86. Affixed to the shaft 32 on flat 35 and adapted to rotate therewith is a circular plate 87 on the face of which, adjacent to the contact block 72, are disposed a pair of concentric conductive rings 88 and 89 which are engaged by the brushes 85 and 86, brush 85 engaging the outer ring 88 and brush 86 contacting the inner ring 89.

On the opposite side of the plate 87 is disposed a speed-regulating and governing mechanism indicated generally at 90 and shown in Figure 6. This mechanism includes a pair of stationary contacts 91 and 92 which are carried by a dielectric plate 87 and are so secured thereon that contact 91 is conductively connected through plate 87 to the outer ring 88 and contact 92 is conductively connected to the inner ring 89 as by conducting rivets (not shown). Cooperating with the stationary contacts 91 and 92 are a pair of movable contacts 93 and 94. The contacts 93 and 94 are carried by contact arms 95 which contact arms in turn are each mounted on generally L-shaped movable members 96. The movable members 96 are pivotally supported on plate 87. Springs 97 carried by the plate 87 cooperate with each of the members 96 to bias the movable contacts 93 and 94 toward engagement with the stationary contacts 91 and 92. One leg 98 of each of the L-shaped members 96 is of greater mass than the other leg 99 to provide a governing means for a purpose to be hereinafter described.

Centrally positioned on the plate 87 is a boss 100 having cut on the outer surface thereof oppositely disposed guiding grooves 101. The grooves 101 are located adjacent the legs 99 of the L-shaped members 96.

Mounted above the shaft 32 is a contact controlling element 105. The element 105 comprises a circular portion 106 from one face of which extends a pair of wedge-shaped legs 107. The legs 107 fit within the oppositely disposed guiding grooves 101 in the boss 100 and are slidably supported thereby. On the opposite face of the circular portion 106 is provided an annular groove 108.

The casing 7 is provided with a neck-down portion 110 having an opening therethrough. A rotatable speed control dial 112 is mounted upon the necked-down portion 110. Indicia shown at 113 are provided on the periphery of the dial 112 to provide for control of the speed of the motor 8. The dial 112 is composed of a translucent material and has a light 114 associated therewith and in circuit with the motor 8 and which will light up when the motor is running. Overlapping the outer periphery of the dial 112 is a chevron-shaped magnifying element 115 which is secured on the casing 7. The element 115 serves to enlarge the individual indicia which pass under it and renders them more easily readable.

Carried by the dial 112 and rotatable therewith is a block-like member 116 which extends through the opening in the necked-down portion 110 of casing 7. About the circumference of the block 116 there is provided a fastening means 117 which serves to secure the dial 112 upon the casing 7.

Cut into the block 116 is a recess 118 in which is rotatably secured an idler element 119. About the periphery of the inner face of block 116 are provided a series of indentations 121 equal in number to the number of indicia provided on the dial 112. To permit an indexing movement of the dial 112 there is carried by the casing 7 a spring-biased ball detent 122 which is adapted to register with the indentations 121.

The idler element 119 is mounted to run in the groove 108 provided on the contact controlling element 105. The dial 112 and the bearing element 116 are so located within the casing that the idler element 119 will be positioned at an angle to the groove 108 as shown in Figure 3.

A push-rod 130 extends from the dial 112 to the movable contact arm 75 and passes through an aperture provided in the casing 7 to be supported thereby. One end of the rod 130 rests within a depression 131 in the dial 112 when the dial is in "off" position. The other end of rod 130 rests within a dimple 129 in the contact arm 75. Upon movement of the dial from the "off" position the push-rod 130 is cammed out of depression 131 to effect a rectilinear movement whereby the opposite end thereof will cause the contact arm 75 to engage the stationary contact 76 and effect the starting of the motor 8.

As the dial 112 is rotated from one position to another the idler element 119 riding in groove 108 moves the contact controlling element 105 into the grooves 101 on boss 100. The wedge-shaped legs 107 of element 105 will engage the L-shaped members 96 to effect progressive disengagement of the movable contacts 93 and 94 away from the stationary contacts 91 and 92 to control the amount of current being fed to the electric motor 8, thereby controlling the speed thereof.

To prevent the electric motor 8 from overspeeding a governing means has been provided in the form of the legs 98 of the L-shaped members 96. These legs have been designed to be of greater mass than the second legs 99 of members 96 so that when the plate 87 tends to rotate at an excessive speed the centripetal force developed by the legs 98 will tend to move them toward the center of plate 87 and against the bias of spring 97 to effect disengagement of the contacts 93 and 94 from 91 and 92 thus cutting the flow of electric current to the motor 8 and slowing it down to a speed where the force of springs 97 are sufficient to overcome the developed centripetal force and again effect engagement of movable contacts 93 and 94 with stationary contacts 91 and 92 to complete the motor circuit.

Included in the motor circuit is a condenser 133 which is adapted to reduce radio interference noises when the electric motor 8 is operating.

Associated with and adapted to be actuated by the remote power unit 1 is the mixer or beater head 3. The mixer 3 consists of a housing which comprises a handle section 135 and a transmission-housing section 136. Formed integrally in the handle section 135 are recesses 139 and 140. Separating the recesses 139 and 140 is a partition wall 141. An aperture 143 extends laterally through the bottom portion of the handle-section and into the recess 139. Studs 144 secure the handle section 135 to the transmission-housing section 136.

The transmission-housing section 136 comprises a main body portion from the front of which extend rearwardly and outwardly two leg members 146 and 147. Depending from the back of the transmission-housing section 136 is a third leg member 150 which is spaced from the ends of legs 146 and 147. A web 157 extends from the base of the housing 136 to the leg 150. Provided in the transmission-housing section 136 are chambers 151 and 152 separated from each other by a partition wall 153. An aperture extends through wall 153 and interconnects the chambers 151 and 152. An aperture 155 extends vertically through the base of the transmission-housing 136 and into chamber 151. Parallel to aperture 155 is a second aperture 156 extending vertically into chamber 152. Extending longitudinally through the rear wall of the transmission-housing 136 there is provided an aperture 158 which connects with chamber 152. Fitted into the aperture 158 is a male coupling 160 which is similar in construction to the male coupling 60 shown in Figures 3 and 4 which was described in connection with the remote power unit 1.

Upon the ends of each of the legs 146 and 147 is attached a pad 161 composed of rubber or any similar resilient material.

It is intended that the mixer or beater head 3, while adapted to be held by hand during operation, will also be provided with means for mounting or clamping the head on the edge of a pan or bowl. The clamping means is indicated generally at 162 and comprises a lever 163 having generally triangular-shaped winged portions 164 which at their upper ends pass on either side of the male coupling 160 and are faired into the surface of the handle portion 135. The lower portions 165 of the wings 164 extend beyond leg 150 and in clamping position lie contiguous to the ends of the leg members 146 and 147. Mounted on a shaft 166 carried by the portions 165 is a roller 167 made of resilient or plastic material adapted to give when brought to bear on the outer surface of a bowl or pan. Associated with the lever 163 is a positioning means comprising a pair of movable blocks 171, the faces of which are provided with serrations 172. The blocks 171 are located on either side of the web 157 and are joined together for common movement by a pin 173 which travels in a slot 174 provided in the web 157. Serrated faces are provided on the leg 150 on either side of the web 157 for cooperation with the serrated movable blocks 171. A pair of disengaging strip springs (not shown) lie in slots (not shown) provided at the base of the web 157 adjacent the serrated faces and bias the movable blocks 171 for disengagement from the serrated faces on the leg 150.

The winged portions 164 of lever 163 are mounted on the ends of pin 173 whereby the lever 163 will be pivotally supported upon the leg 150. Pivotal movement of the lever 163 effects movement of the movable blocks 171 to engage and disengage these blocks from the serrated faces on the leg 150.

To clamp the beater head 3 to a pan or bowl 4 the lever 163 will first be actuated in a clockwise direction which will permit the disengaging strip springs (not shown) to flex to disengage the movable blocks 171 from the serrated faces 174. With the movable blocks 171 disengaged a lateral pull is applied to the lever 163 to effect a movement of the blocks 171 parallel to the serrated faces and simultaneously move the roller 167 in a direction away from the ends of legs 146 and 147. The rim of the bowl 4 may then be inserted in the space between the roller 167 and the ends of legs 146 and 147 so that the ends of the legs rest within the bowl 4. To clamp the mixer 3 to the bowl 4 the lever 163 will be pushed forward to engage the roller 167 with the outer side of the rim of the bowl 4. Thus with the ends of legs 146 and 147 bearing on the inner surface of bowl 4 and the roller 167 bearing on the outer surface the lever 163 is pivoted in a counterclockwise direction moving the pin 173 to effect the engagement of the movable blocks 171 with the serrated faces thereby firmly clamping the beater head 3 on the bowl 4. The ability of the movable blocks 171 to be clamped at different locations upon the serrated faces 174 permits the roller 167 to be positioned at various distances from the ends of legs 146 and 147. It is thus seen that bowls having different, but conventional, wall thicknesses may be accommodated by the clamping means described.

A rotatable hollow power shaft 176 extends from chamber 151 through a bearing provided in the aperture connecting chamber 151 and 152 and then across chamber 152 and into the male coupling 160.

A pair of power-transmitting bevel gears 180 are carried by the shaft 176 on either side of the partition wall 153. Mating bevel gears 182 cooperate with gears 180 and have formed integrally therewith spindle portions 184 which are adapted to revolve within the apertures or bores 155 and 156. Disposed on each of the spindle portions 184 is a spring washer 187 which is located between the shoulders of the gears 182 and steel washers 188 which rest on the floors of the chambers 151 and 152. The spring washers 187 serve to bias the bevel gears 182 into engagement with gears 180 thus eliminating to a considerable extent the back-lash which is experienced with gears of this type. An important function of the spring washers 187 is to provide a safety factor. If the user of the beater 3 should inadvertently catch his or her hand in the beater elements 190 (to be described) the stress placed on the beater elements 190 will effect a compression of the spring washers 187 to disengage the gears 182 from the power gears 180 thus stopping the feeding of motive force to the beaters and thereby preventing serious injury to the hand of the user. With his free hand the user may actuate the "on-off" switch to shut off the current and then disengage his fingers.

The defining walls of the apertures 155 and 156 containing the spindle portions 184 act as bearing surfaces for the spindles. Helical grooves 191 are provided on the exterior surface of the spindle portions 184 and provide passage ways for lubricating fluid.

The spindle portions 184 are hollow, the openings being square in shape, and are adapted to receive the ends of the square shafts 192 carrying the beater elements 190. Grooves 193 are formed near the upper ends of shafts 192 into which spring biased ball detents 194 carried by the spindles 184 are adapted to snap, thereby securing the shafts 192 to the spindles for rotation therewith.

It is contemplated that the mixer of the present invention will be utilized with pans or bowls of varying depth and the beaters are therefore so constructed that the beater elements 190 are adapted to occupy a number of positions on the shafts 192 to accommodate bowls of different depths. To accomplish this the shafts 192 are provided with a square bore extending from its lower end in which is disposed a spring 196. Located in the bore and biased by spring 196 is a square shaft 197 adapted to move therein. The shaft 197 is secured at its lower end to the beater elements 190. The bottom of the shaft 197 will provide a bearing point upon which the beater may rotate. The upper ends of the beater elements 190 have formed therein square orifices into which fit the square shafts 192 whereby the beater elements may move upon the shafts. A land 199 provided on the end of each shaft 192 prevents the beater elements 190 from coming free. Thus with the construction described when the mixer is used with a shallow bowl the bottom of the bowl will adjust the position of the square shaft 197 within shaft 192 and against the bias of spring 196 to cause the beater elements to move upwardly.

It is here pointed out that the mixer or beater head 3 described herein is so constructed that its center of gravity will be substantially within the periphery of the bowl on which it is mounted so that there is little likelihood of the bowl tipping and the mixing task may be performed without the user holding the mixer head.

The motive power for driving the beater elements 190 is supplied from the electric motor 8 remotely located therefrom through a flexible drive shaft 5, which is capable of transmission of torque and motion with very minor losses. The drive shaft 5 is encased in a flexible sheath 200 which is in turn enclosed in an outer covering 201 which may be of any material, such as rubber, capable of deformation and which is resilient enough to permit the flexible shaft to be bent and twisted even as it transmits power from the remotely located power source. It is understood that the exact construction of the flexible drive shaft is not part of this invention.

At each end of the flexible shaft 5 there is provided a female coupling 203 which coupling is adapted to engage with the male coupling elements 60 and 160 provided on the remote power unit 1 and the mixer head 3. It is here pointed out that though the flexible shaft 5 is here shown connected to a beater head 3, the flexible shaft 5 is adapted through the female couplings 203 to be connected to a variety of household devices on which a male coupling is provided for operation thereof.

The female coupling 203 (as best shown in Figure 4) consists of a sleeve member 204, the end 205 of which is firmly fixed to the flexible sheath 200 as by swaging. An end of the flexible drive shaft 5 extends into the sleeve member 204 as shown. A lubricant seal 207 is carried by the shaft 5 and has a steel or brass washer 208 associated therewith. Adjacent the lubricant seal 207 is a thrust collar 209 which is swaged to the drive shaft 5 and serves to keep the shaft from slipping out of its encasing covers; it is noted that there will be a thrust collar on either end of the shaft 5. The outer end of the flexible drive shaft 5 is formed into a square or key 210. As stated above rotatable hollow shaft 55 which carries the worm gear 54 driven by motor 8 has a square-shaped opening provided at its outer end 59. This opening is adapted to receive the keyed end 210 of the flexible drive shaft 5. Thus when the motor 8 rotates shaft 55 through worm 34 and worm gear 54 it will effect a rotative movement of the flexible drive shaft 5.

In the outer periphery of sleeve member 204 of the female coupling 203 there is provided an annular groove 211. On the base of the groove 211 a number of holes are formed into which holes the ball detents 213 are disposed, the holes are of smaller diameter than the balls 213 so that they cannot pass completely through. A snap ring 214 is also carried within the groove 211 and biases the ball detents 213 inwardly. Thus when the female coupling 203 is fitted over the male coupling 60 the ball detents 213 will be forced into the annular recess 61 provided on the male coupling 60 to firmly affix the two couplings together. When it is desired to disengage the couplings it is necessary only to apply a pull upon the sleeve member 204.

As pointed out hereinbefore a female coupling 203 is provided at either end of the flexible drive shaft 5. Both ends of the shaft are squared or keyed so either end can be used interchangeably. Having affixed one female coupling 203 to the male coupling 60 at the remote power source 1 the other female coupling is affixed to the male coupling 160 at the mixer head 3. With the female coupling affixed the squared end of the flexible drive shaft 5 will fit into the end of the hollow shaft 176 provided at the mixer head 3. The opening through shaft 176 is also square-shaped to closely receive the squared end of shaft 5.

With the electric motor 8 running the hollow power shaft 55 at the remote source 1 will provide a rotative movement to the flexible drive shaft 5, this movement will be transmitted by the shaft 5 to the shaft 176 in the beater head 3. Rotation of shaft 176 operates the bevel gears 180 carried thereby to drive the gears 182 and thereby rotate the beater shafts 192 and the beater elements 190 carried thereby.

Since it is advantageous to be able to control the operation of the beater elements 190 at the beater head 3 and not have to carry the rotating beater while walking back to the power unit 1 to shut the current off there, a remote switching device 217 is provided at the beater head which controls the operation of the remotely located electric motor 8. This switching device comprises a rod 215 which extends substantially the length of the hollow rotatable shaft 176 and has one end abutting against the end of the flexible drive shaft 5 disposed within the shaft 176. A finger portion 216, as shown in Figure 7, is affixed to the other end of rod 215 and extends therefrom to project through the slot 143 in handle-section 135 to locate a part thereof exteriorly of handle-section 135, this projecting part is adapted to be grasped manually to move or slide the finger portion 216 back and forth within its slot 143. Finger portion 216 being affixed, at its housed end, to the end of rod 215 will, when moved back and forth, as described, effect reciprocatory movement of the rod 215 within shaft 176. The flexible drive shaft 5 is used as the mechanical means for actuating the "on-off" switch 63, located at the remote power unit 1. The end of drive shaft 5 disposed within hollow shaft 55 abuts against the upper end of push rod 65 carried within shaft 55, and push rod 65 at its lower end engages the actuating rod 64 for switch 63.

Assuming that the beaters 190 are operating and it is desired to stop them, the operator will move finger portion 216 to move rod 215 rectilinearly within shaft 176 to effect longitudinal movement of the flexible drive shaft 5 within its casing. The opposite end of the longitudinally moving drive shaft 5 will move the push rod 65 against actuating rod 64 to operate "on-off" switch 63 to cause its contacts to disengage and break the motor circuit thereby stopping the motor 8. The construction of switch 63 is desired to be such that actuating rod 64 will move outwardly after the contacts have been disengaged and manual pressure is taken off finger portion 216 thereby moving all the elements back so that when finger portion 216 is next actuated it will result in movement of the contacts of switch 63 to engaged position to complete the motor circuit.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. In a mixing device, beater means, a motor located separately and remotely from said beater means, a flexible transmission shaft, arranged for bodily movement, interconnecting said beater means and said motor whereby said motor effects operation of said beater means, a first switch located at and carried by said motor for effecting starting and stopping thereof, a second switch located at and carried by said motor for effecting starting and stopping thereof, switching means located at and carried by said beater means and an operative connection between said switching means and one of said switches at said motor, said operative connection comprising said flexible transmission shaft, said switching means being manually operable to bodily move said flexible shaft to actuate said one of said switches at said motor.

2. A mixing device comprising beater means, a motor located separately and remotely therefrom, a force transmitting flexible shaft interconnecting said beater means and said motor whereby said motor effects the operation of said beater means, a switch carried by and located at said motor for controlling the starting and stopping thereof, means providing an operative connection between said switch and said flexible shaft whereby said flexible shaft may operate said switch, switching means carried by said beater means and means providing an operative connection between said switching means and said flexible shaft whereby said switching means may actuate said flexible shaft for effecting movement thereof to operate said switch carried by said motor to start and stop said motor.

3. In a mixing device, a beater head comprising beater means and a hollow power shaft operatively connected to said beater means for actuation thereof, a power unit located separately and remotely from said beater head and comprising a motor, a second hollow power shaft which is adapted to be actuated by said motor, a switch located at said motor for controlling the starting and stopping of the motor, switch actuating means disposed within said second power shaft, a power transmitting shaft the ends of which are adapted to be received within said hollow power shafts, with that end of the power transmitting shaft disposed within said second power shaft being adapted to engage said switch actuating means, and a manually operable means associated with said hollow power shaft at said beater head adapted to move the end of the power transmitting shaft disposed in the said latter power shaft to effect longitudinal movement of said power transmitting shaft and thereby move said switch actuating means within said second hollow power shaft to operate said switch.

4. In a mixing device, beater means, a motor located separately and remotely from said beater means, a flexible transmission shaft interconnecting said beater means and said motor whereby said motor effects operation of said beater means, means mounting said flexible transmitting shaft for bodily movement, a first switch carried by said motor for effecting starting and stopping thereof, a second switch carried by said motor for effecting starting and stopping thereof, means operatively connecting one of said switches to said flexible transmission shaft for operation thereby, switching means carried by said beater means, and means operatively connecting said switching means to said flexible transmission shaft whereby the switching means may effect movement of the shaft to cause the shaft to operate the motor switch to which it is operatively connected.

5. In a mixing device, a portable beater means, a motor located separately and remotely from said beater means, a flexible transmission shaft interconnecting said beater means and said motor whereby said motor effects operation of said beater means, means mounting said flexible transmitting shaft for movement in the direction of its length, a first switch carried by said motor for effecting starting and stopping thereof, a second switch carried by said motor and within the casing thereof for effecting starting and stopping of the motor, means operatively connecting said second switch to said flexible transmission shaft for operation thereby, switching means carried by said beater means, and means operatively connecting said switching means to said flexible transmission shaft whereby the switching means may effect movement of the shaft to cause the shaft to operate said second motor switch to which it is operatively connected.

6. In a mixing device, a beater head comprising a beater element and a power shaft operatively connected to the beater element, a power unit located separately and remotely from said beater and comprising a motor, a second power shaft which is adapted to be actuated by said motor, a power transmitting flexible shaft operatively interconnecting said two power shafts for common rotative movement, means mounting said power transmitting flexible shaft for longitudinal movement, a switch carried by said motor for effecting starting and stopping thereof, means operatively connecting said flexible shaft to said switch whereby the shaft may operate the switch, a manually operable switching means carried by said beater head, and means operatively connecting said switching means with said flexible shaft whereby the switching means may effect movement of the flexible shaft to cause it to operate the motor switch.

HOWARD F. SCHMIDT.

REFERENCES CITED

The following references are of record in the file of this patent:

UNITED STATES PATENTS

| Number | Name | Date |
|---|---|---|
| 356,694 | Morey | Jan. 25, 1887 |
| 1,343,829 | Kepler | June 15, 1920 |
| 1,400,553 | Jenks et al. | Dec. 20, 1921 |
| 1,592,550 | Webb | June 13, 1926 |
| 1,766,172 | Hiles | June 24, 1930 |
| 1,774,509 | Gould | Sept. 2, 1930 |
| 1,848,529 | Hoe | Mar. 8, 1932 |
| 2,115,956 | Jorgensen | May 3, 1938 |
| 2,278,187 | Strauss et al. | Mar. 31, 1942 |
| 2,292,566 | Jordan | Aug. 11, 1942 |

FOREIGN PATENTS

| Number | Country | Date |
|---|---|---|
| 595,457 | Germany | Apr. 13, 1934 |